(12) United States Patent
Massarotto

(10) Patent No.: US 8,167,479 B2
(45) Date of Patent: May 1, 2012

(54) APPARATUS FOR DOSING AND MIXING SOLID POWDERS IN TECHNOLOGICAL PROCESSES FOR CONVERTING PLASTIC MATERIALS

(75) Inventor: Loris Massarotto, Triuggio (IT)

(73) Assignee: Impianti OMS S.P.A., Verano Brianza (IT)

( * ) Notice: Subject to any disclaimer, the term of this patent is extended or adjusted under 35 U.S.C. 154(b) by 980 days.

(21) Appl. No.: 12/153,835

(22) Filed: May 27, 2008

(65) Prior Publication Data

US 2009/0022007 A1   Jan. 22, 2009

(30) Foreign Application Priority Data

Jul. 18, 2007   (IT) .............................. MI2007A1444

(51) Int. Cl.
*B01F 15/02* (2006.01)
*B01F 15/00* (2006.01)
*A21C 1/00* (2006.01)
*B29B 7/00* (2006.01)
*B29C 47/10* (2006.01)
*B01F 15/04* (2006.01)
*G05D 11/04* (2006.01)
*B67D 7/70* (2010.01)

(52) U.S. Cl. ........ 366/132; 366/131; 366/133; 366/134; 366/135; 366/136; 366/137; 366/167.1; 366/168.1; 366/173.1; 366/76.2; 366/160.4; 366/162.3; 366/152.2; 222/137

(58) Field of Classification Search .......... 366/131–137, 366/167.1, 168.1, 173.1, 76.2, 160.4, 162.3, 366/152.2; 222/137
See application file for complete search history.

(56) References Cited

U.S. PATENT DOCUMENTS

| | | | | |
|---|---|---|---|---|
| 3,140,078 | A | * 7/1964 | Grubb et al. | ................... 366/256 |
| 4,257,992 | A | * 3/1981 | Schulte et al. | ................ 264/45.3 |
| 4,279,360 | A | 7/1981 | Haeuser | |
| 4,498,783 | A | * 2/1985 | Rudolph | ........................ 366/132 |
| 5,152,943 | A | * 10/1992 | Sulzbach | ..................... 264/40.7 |
| 5,388,761 | A | 2/1995 | Langeman | |
| 5,545,029 | A | * 8/1996 | Hauser | ........................... 425/557 |
| 5,697,702 | A | * 12/1997 | Triassi et al. | .............. 366/152.2 |
| 2006/0209623 | A1 | 9/2006 | Duschanek et al. | |

* cited by examiner

*Primary Examiner* — Khanh P Nguyen
*Assistant Examiner* — Matthew Hoover
(74) *Attorney, Agent, or Firm* — Modiano & Associati; Albert Josif; Daniel O'Byrne

(57) ABSTRACT

An apparatus for dosing and mixing solid powders in technological processes for converting plastic materials, comprising an assembly for dosing the solid powders to be mixed with a first process liquid before mixing with an additional process liquid, the dosage assembly comprising at least one hydraulic cylinder for introducing the powders at a preset pressure which is correlated to the pressure of the first process liquid kept at a controlled pressure.

15 Claims, 1 Drawing Sheet

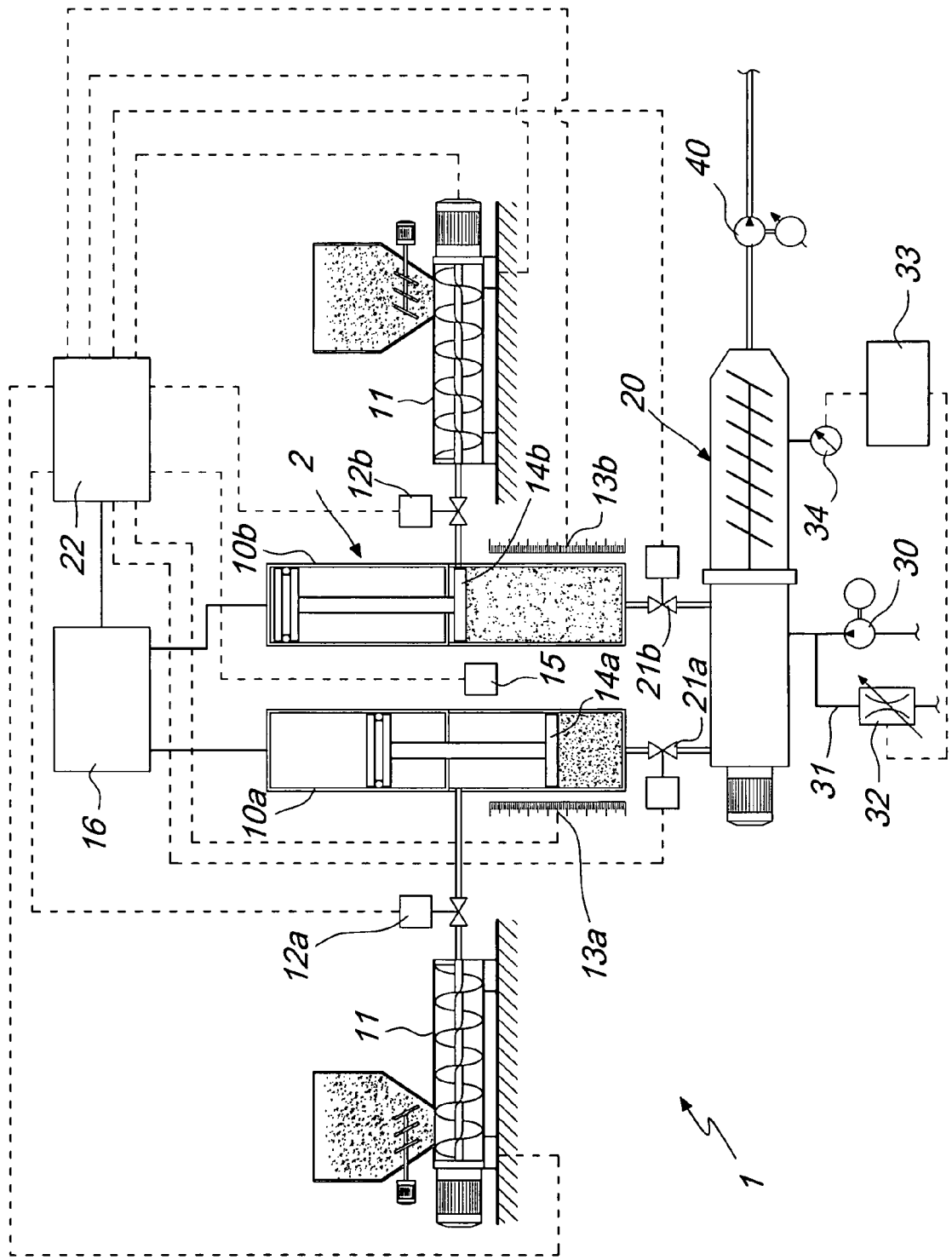

APPARATUS FOR DOSING AND MIXING SOLID POWDERS IN TECHNOLOGICAL PROCESSES FOR CONVERTING PLASTIC MATERIALS

The present invention relates to an apparatus for dosing and mixing solid powders in technological processes for converting plastic materials.

BACKGROUND OF THE INVENTION

As is known, in several technological processes for converting plastic materials, solid powders, commonly known as mineral fillers, are used which must be mixed with the components in order to obtain the final product.

Typically, solid powders are used to give the final manufactured article being produced better physical and mechanical characteristics, and in other cases the solid powders merely have the function of an inert product in order to reduce the cost of the final manufactured article and to be able to recycle plastic material waste by means of a mechanical recycling process.

The application of solid powders is commonly used in continuous or discontinuous processes, also in the production of expanded polyurethanes, in which solid powders are introduced which are constituted both by mineral fillers and by finely pulverized production waste.

Typically, the solid powders must be dosed and premixed with a first process liquid, which is normally polyol, so-called reagent liquid, and this mixing is performed by using a mixing tank, technically known as "batch system", or by using a dynamic mixer directly in-line, with a method commonly known as "in-line system".

The mixture that is formed, in both systems, is conveyed to the intake of a dosage pump, whose line leads to the mixing head, where the line of the other reagent liquid for forming the polyurethane polymer, more precisely isocyanate, is provided.

The mixing heads that are used can be low- or high-pressure.

The systems for dosing solid powders currently used suffer considerable problems as regards dosage precision which, by being typically provided by means of a single- or double-screw type, inevitably generates dosage variations, since the powders are compressible and this error becomes considerably greater if the powder has to be introduced in a pressurized circuit.

Prior solutions, disclosed, for example in U.S. Pat. Nos. 5,152,943, 5,547,276 and 5,332,309, provide devices which use compression dosage screws so as to dose the solid powders in the liquid with a certain pressure value.

As is known, in these embodiments, a variation of the density of the solid powder entails an anomaly in the dosage, and therefore a system for feedback of the signal related to the pressure developed in the premixer chamber is used, which increases or decreases the rotation rate of the dosage screw by comparing it to a set pressure value, accordingly modifying the degree of compression of the solid powder in order to keep the dosage constant over time.

It is evident that maintaining the dosage of the solid powders at a constant value encounters considerable difficulties, which derive from the slowness of response in the system and from the fact that, in the solutions of the background art, the pressure variation in practice is entrusted directly to the variation of the rotation rate of the screw, with the inevitable associated inaccuracies.

SUMMARY OF THE INVENTION

The aim of the invention is to solve the problems described above by providing an apparatus for dosing and mixing solid powders in technological processes for converting plastic materials which allows to improve considerably the degree of accuracy and repetitiveness of the dosage of solid powders introduced in a circuit at pressure conditions even higher than 3 bars.

Within this aim, an object of the invention is to provide an apparatus which allows to provide continuous dosage though using elements which operate discontinuously and are coordinated so as to obtain a continuous dosage.

Another object of the present invention is to provide an apparatus for dosing and mixing solid powders in technological processes for converting plastic materials which, thanks to its particular constructive characteristics, is capable of giving the greatest assurances of reliability and safety in use even with different types of solid powders.

Another object of the present invention is to provide an apparatus for dosing and mixing solid powders in technological processes for converting plastic materials which can be obtained easily starting from commonly commercially available elements and materials and is also competitive from a merely economic standpoint.

This aim and these and other objects, which will become better apparent hereinafter, are achieved by an apparatus for dosing and mixing solid powders in technological processes for converting plastic materials, according to the invention, comprising an assembly for dosing the solid powders to be mixed with a first process liquid before mixing with an additional process liquid, characterized in that said dosage assembly comprises at least one hydraulic cylinder for introducing the powders at a preset pressure which is correlated to the pressure of said first process liquid kept at a controlled and constant pressure.

BRIEF DESCRIPTION OF THE DRAWINGS

Further characteristics and advantages of the invention will become better apparent from the description of a preferred but not exclusive embodiment of an apparatus for dosing and mixing solid powders in technological processes for converting plastic materials, illustrated by way of non-limiting example in the accompanying drawing, wherein the only FIGURE is an operating diagram of the apparatus according to the invention.

DESCRIPTION OF THE PREFERRED EMBODIMENTS

With reference to the only FIGURE, the apparatus for dosing and mixing solid powders in technological processes for converting plastic materials, generally designated by the reference numeral 1, comprises an assembly 2 for dosing solid powders to be mixed with a first process liquid which has its own feeding circuit, which will be described in detail hereinafter.

The dosage assembly comprises at least one and preferably a first hydraulic cylinder 10a and a second hydraulic cylinder 10b, each of which is connected to a gravimetric or volumetric screw 11 for feeding the solid powders into the cylinder.

Between the gravimetric and volumetric screws 11 and the cylinders 10a and 10b servo-controlled valves 12a and 12b are interposed which allow or prevent the entry of the solid powders into the cylinders.

Advantageously, the two cylinders work in two distinct operating states; specifically, when the first cylinder 10a is in the compression or dosage step, the second cylinder 10b is in the powder feeding step.

At the cylinders, a first linear transducer 13a and a second linear transducer 13b are respectively provided for detecting the stroke of the pistons 14a and 14b.

There is also a photocell 15 for controlling the maximum load of the powders in the cylinders 10a and 10b.

The dosage cylinders are moved by means of a hydraulic control unit 16, which manages operation.

The solid powders that exit from the cylinders 10a and 10b are introduced in a dynamic mixer 20 by interposing control valves 21a and 21b for connection to the respective cylinder.

The actuation of the control valves 21a and 21b is entrusted to a central control unit 22.

The circuit for feeding the first process liquid, which in the case of the production of polyurethanes is typically constituted by polyol and optional other liquids, provides a pump 30 of the volumetric type which leads into the dynamic mixer 20 and is connected to a recycling circuit 31, on which there is a servo-controlled pressure regulator 32 and an electronic control device 33, which allows to set a certain pressure value, comprised normally between 3 and 10 bars, and which, depending on the value of the pressure of the liquid detected by the transducer 34 connected to the dynamic mixer 20, acts on the pressure regulator 32, keeping the set pressure value constant over time.

The pump 30 preferably has a higher flow-rate than the pump 40 for final dosage, in which the product that exits from the dynamic mixer is introduced, and advantageously the flow-rate ratio is comprised between 1.5 and 2, and the pressure regulation range can be comprised between 3 and 10 bars.

Following the adjustment of the recirculation pressure of the first process liquid, the operating sequence provides for a preliminary step of compression of the solid powders to a value which is equal to the value of the pressure of the liquid recorded on the pressure transducer 34.

In detail, the gravimetric or volumetric screw is operated and the valves 12a and 12b for feeding into the dosage cylinders 10a and 10b are opened selectively.

The valves 21a and 21b for feeding the solid powders to the dynamic mixture are closed.

The photocell 15 determines that maximum loading has occurred and simultaneously stops the gravimetric or volumetric screw, switching the feeding valves 21a and 21b to the closed position.

The step for compression of the solid powders occurs by way of the movement of the pistons 14a and 14b provided in the dosage cylinders 10a and 10b, which are actuated by the hydraulic control unit 16, and the compression value, equal to the pressure value set on the liquid, is determined by acting on an oil-based pressure regulator, which is controlled automatically and is located in the control unit 16.

The pistons 14a and 14b of the dosage cylinders have a layer of composite material, in the portion in contact with the solid powders, so as to allow, during the compression step, the evacuation of the air that is present in the solid powders and the corresponding exit from the cylinders, by way of appropriately provided channels, which are provided normally in the feeding valves 12a and 12b.

Once the compression step has ended, the central unit 22 detects, by way of the linear transducers 13a and 13b, the volume occupied by the compressed solid powders and, as a function of the loaded quantities, the density that will allow ultimately to control the correct set dosage of solid powders over time is calculated.

The quantity and the corresponding dosage flow-rate of the solid powders is set in the central unit which controls and manages the operation of the hydraulic control unit 16 according to the flow-rate required for the solid powders.

In operation, one of the dosage cylinders 10a and 10b starts to introduce the solid powders in the dynamic mixer by opening simultaneously the corresponding feeding valve 21a and 21b, while the other cylinder 10b waits for the first cylinder to end its stroke.

The relative stroke of the pistons in the cylinders is controlled by the linear position transducers, and by way of a feedback signal to the hydraulic control unit, their speed is kept under control, ensuring a constant flow-rate of the solid powders over time.

Once the stroke of one cylinder has ended, the feeding valve closes and at the same time the other feeding valve opens, consequently starting the movement for the other cylinder.

While one cylinder is in the dosage step, the other cylinder again performs all the steps described earlier and in particular performs feeding and loading, compression and standby for the dosage of the solid powders.

The use of two hydraulically-actuated cylinders allows to have continuous operation with precise dosage of the solid powders, which are precompressed adequately.

Any increase in the viscosity of the solid-liquid mixture being formed, correlated to the amount of solid introduced and to the initial viscosity of the liquid, does not compromise the pressure value detected on the dynamic mixer 20, since the previously preset pressure value is kept constant by the appropriately provided regulator 32 which is arranged on the liquid recirculation circuit.

Maintaining the pressure value, recorded on the dynamic mixer, ensures constant density and therefore a dosage of the solid powders that remains precise and constant over time.

From what has been described above it can thus be seen that the invention achieves the proposed aim and objects, and in particular the fact is stressed that using hydraulic cylinders for the dosage and compression of solid powders allows to adjust the pressure precisely, with the consequent possibility to have precise and constant dosage of the solid powders even with a pressure above 3 bars.

The invention thus conceived is susceptible of numerous modifications and variations, all of which are within the scope of the appended claims.

All the details may further be replaced with other technically equivalent elements.

In practice, the materials used, so long as they are compatible with the specific use, as well as the contingent shapes and dimensions, may be any according to requirements and to the state of the art.

The disclosures in Italian Patent Application no. MI2007A001444, from which this application claims priority, are incorporated herein by reference.

What is claimed is:

1. An apparatus for dosing and mixing solid powders in technological processes for converting plastic materials, comprising
    a dosing assembly for dosing the solid powders to be mixed with a first process liquid before mixing with an additional process liquid,
    a dynamic mixer connected with said dosing assembly such that said solid powders are fed into said dynamic mixer from said dosing assembly, a first process liquid circuit connected to said dynamic mixer and feeding said first process liquid into said dynamic mixer for mixing said first process liquid with said solid powders in said dynamic mixer, a recycling circuit connected to said first process liquid circuit and to said dynamic mixer, said recycling circuit being adapted to control a pressure value of said first process liquid in said dynamic mixer, said dosage assembly comprising at least one hydraulic cylinder for introducing the solid powders in said dynamic mixer at a preset pressure which is correlated to the controlled pressure value of said first process liquid.

2. The apparatus, according to claim 1, wherein said solid powder dosage assembly comprises a first hydraulic cylinder and a second hydraulic cylinder, which are connected respectively to a gravimetric or volumetric screw for introducing solid powders in the cylinder.

3. The apparatus according to claim 2, wherein it comprises, between each gravimetric or volumetric screw and the respective cylinder, a servo-controlled valve for controlling the introduction of the solid powders into the respective cylinder.

4. The apparatus according to claim 2, wherein said first and second cylinders work in two mutually distinct operating stages.

5. The apparatus according to claim 2, wherein it comprises a first linear transducer and a second linear transducer, which are respectively connected to said first and second cylinders.

6. The apparatus according to claim 2, wherein it comprises a photocell for controlling the maximum load of said solid powders in said cylinders.

7. The apparatus according to claim 2, wherein said dynamic mixer is arranged downstream of said cylinders with the interposition of respective control valves.

8. The apparatus according to claim 7, wherein it comprises a central control unit which acts on said control valves.

9. An apparatus for dosing and mixing solid powders in technological processes for converting plastic materials, comprising an assembly for dosing the solid powders to be mixed with a first process liquid before mixing with an additional process liquid, said dosage assembly comprising at least one hydraulic cylinder for introducing the powders at a preset pressure which is correlated to the pressure of said first process liquid kept at a controlled pressure, said solid powder dosage assembly comprising a first hydraulic cylinder and a second hydraulic cylinder, which are connected respectively to a gravimetric or volumetric screw for introducing solid powders in the cylinder, the apparatus further comprising a dynamic mixer arranged downstream of said cylinders with the interposition of respective control valves, and the apparatus further comprising a circuit for feeding said first process liquid which has a pump which leads into said dynamic mixer and is connected to a recycling circuit on which there is a servo-controlled pressure regulator and an electronic control device for setting a preset pressure value, there being also a pressure transducer which is connected to said dynamic mixer and acts on said pressure regulator.

10. The apparatus according to claim 9, wherein it comprises, at the output of said dynamic mixer, a final dosage pump, said pump of said circuit for feeding said first process liquid having a higher flow-rate than said final dosage pump.

11. The apparatus according to claim 10, wherein said pump of said circuit for feeding said first process liquid has a flow-rate 1.5 to 2 times higher than the flow-rate of said final dosage pump.

12. The apparatus according to claim 9, wherein the pressure value to which said solid powders are compressed is substantially equal to the pressure value of said circuit of said first process liquid.

13. The apparatus according to claim 2, wherein the pistons of said dosage cylinders have a layer of composite material, at least in the portion in contact with said solid powders, for evacuating the air that is present between said solid powders.

14. The apparatus according to claim 4, wherein while one of said cylinders is in the dosage step, the other one of said cylinders is in the step for feeding, loading and compressing said solid powders.

15. The apparatus according to claim 1, wherein the dosage of the solid powders at constant pressure is suitable to allow a density and flow-rate thereof which is substantially constant over time.

* * * * *